April 12, 1932. W. FERRIS 1,854,127
HYDRAULIC TRANSMISSION
Filed Feb. 12, 1926 7 Sheets-Sheet 1

INVENTOR
WALTER FERRIS.
BY
ATTORNEY

INVENTOR
WALTER FERRIS
BY Ralph L. Brown
ATTORNEY

April 12, 1932. W. FERRIS 1,854,127
HYDRAULIC TRANSMISSION
Filed Feb. 12, 1926 7 Sheets-Sheet 3

INVENTOR
WALTER FERRIS
BY
ATTORNEY

April 12, 1932.   W. FERRIS   1,854,127
HYDRAULIC TRANSMISSION
Filed Feb. 12, 1926   7 Sheets-Sheet 4
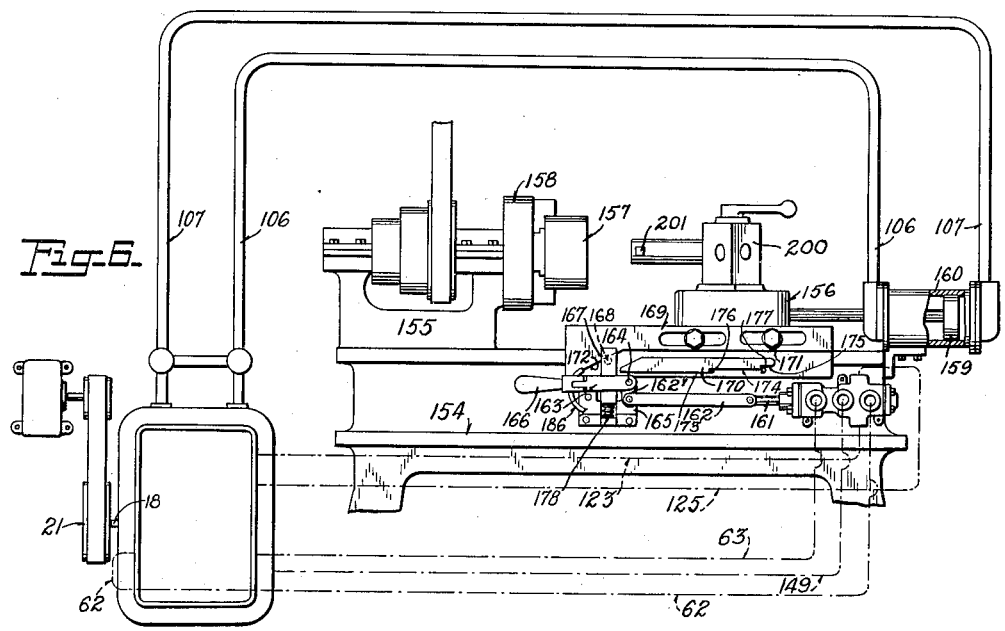
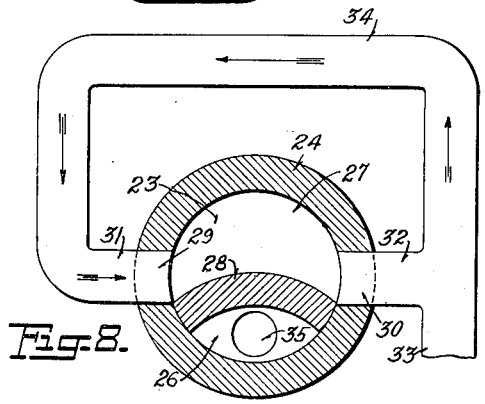
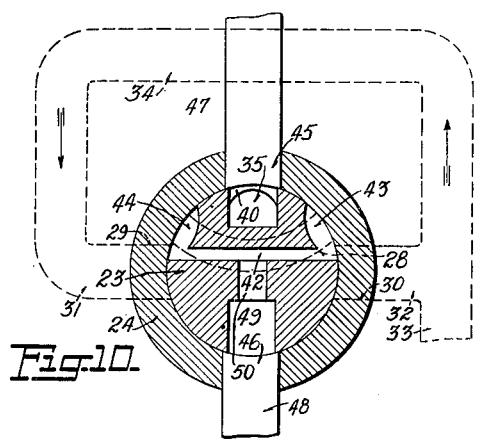
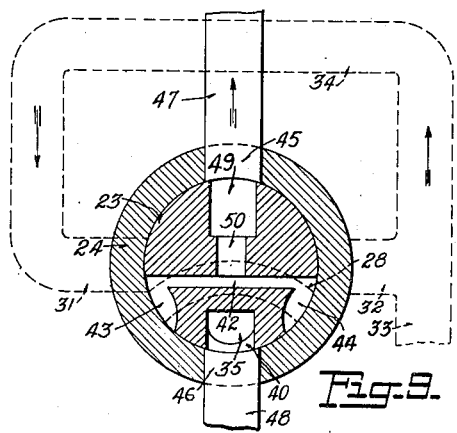
INVENTOR.
WALTER FERRIS.
BY
ATTORNEY.

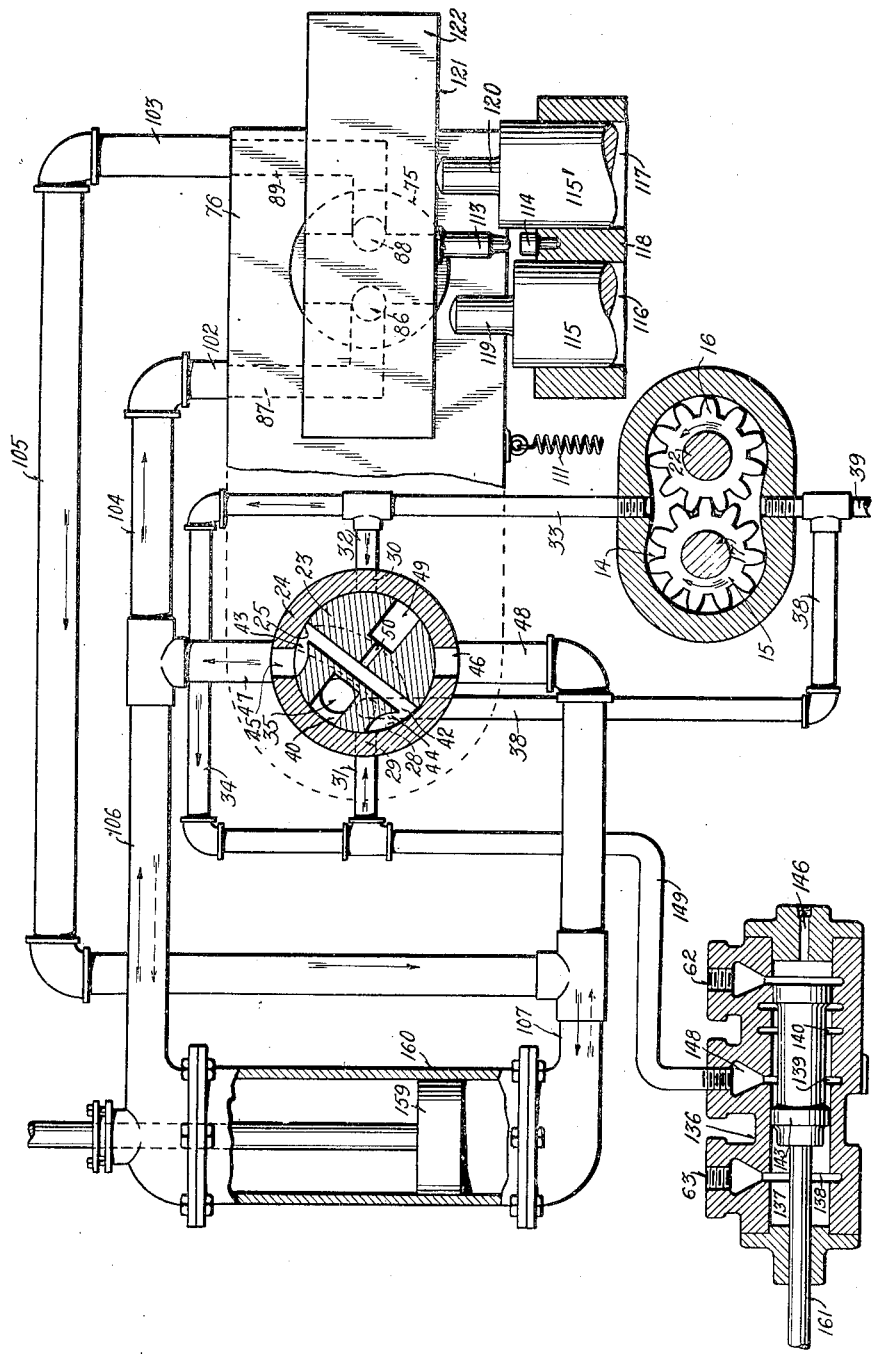

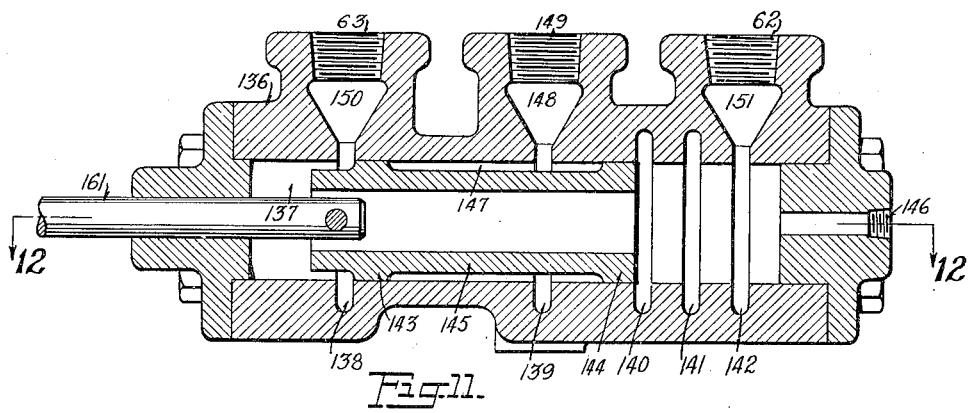
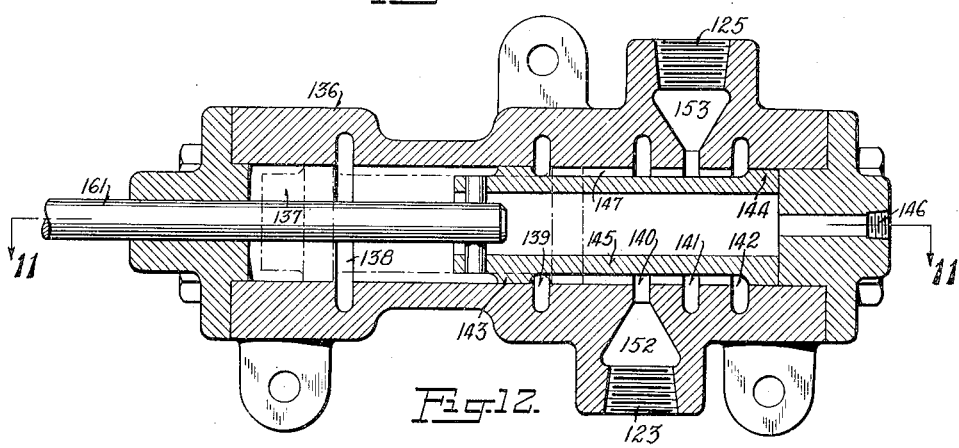
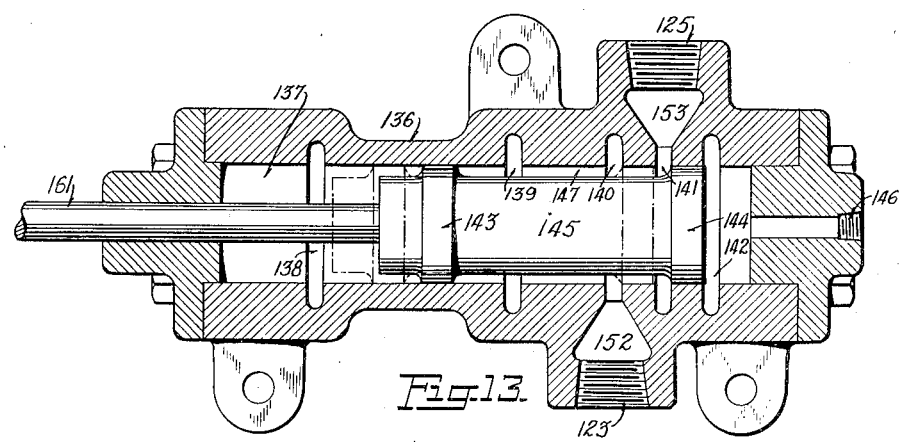

April 12, 1932. W. FERRIS 1,854,127
HYDRAULIC TRANSMISSION
Filed Feb. 12, 1926 7 Sheets-Sheet 7
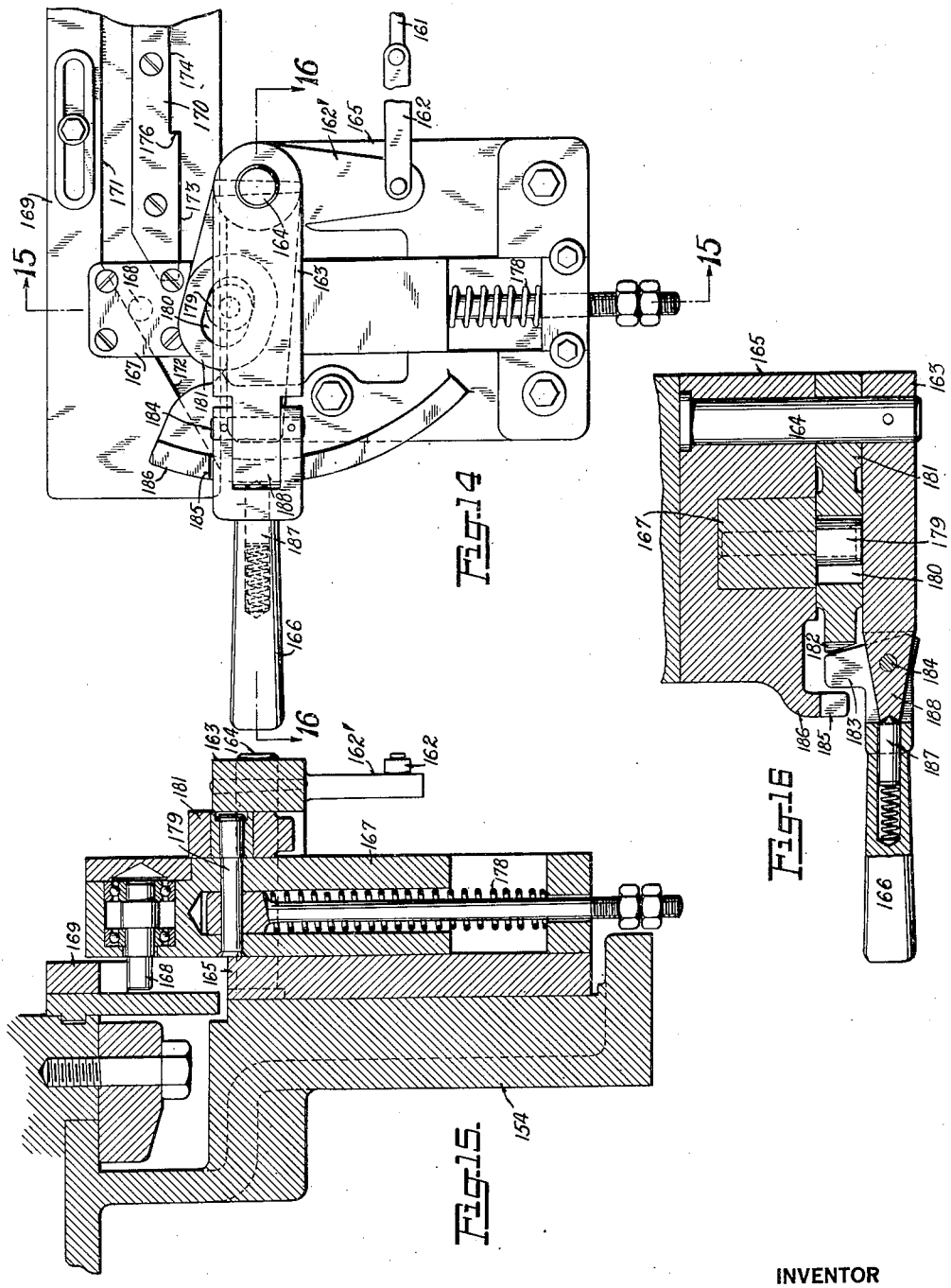
INVENTOR
WALTER FERRIS
BY
ATTORNEY Patented Apr. 12, 1932

1,854,127

UNITED STATES PATENT OFFICE

WALTER FERRIS, OF MILWAUKEE, WISCONSIN, ASSIGNOR TO THE OILGEAR COMPANY, OF MILWAUKEE, WISCONSIN, A CORPORATION OF WISCONSIN

HYDRAULIC TRANSMISSION

Application filed February 12, 1926. Serial No. 87,791.

This invention relates to variable speed hydraulic transmissions.

The hydraulic transmission to which the invention applies in particular is of a type well adapted for operating the tool or work carriages of machine tools.

In my copending application Serial No. 460,184, filed April 11, 1921, which has matured into Patent No. 1,619,200, issued March 1, 1927, I have described a hydraulic transmission of the type mentioned capable of effecting operation of a driven part at speeds within either of two distinct speed ranges, and at accurately controlled selective speeds within the lower speed range. That transmission includes a pump mechanism comprising a variable displacement pump of relatively low capacity combined with a constant displacement pump of relatively high capacity, the rate and direction of discharge from both pumps being placed under the control of a single element under the operator's control.

In the transmission therein described the constant displacement pump serves several purposes. It is used (1) to effect operation of the driven part within the high speed range above mentioned; (2) to maintain the return side of the circuit flooded against leakage losses; (3) to supply liquid to the circuit in such quantities as to compensate for variations in volumetric capacity within the main circuit; and (4) to supercharge the variable displacement pump.

An object of the present invention is the provision of an improved hydraulic transmission which is applicable to a wide range of uses and which may be readily and easily controlled under various conditions of installation to afford an abrupt change in the rate of movement of the driven member during unidirectional movement thereof.

Another object is the provision of a pump fed hydraulic transmission having improved pump regulating mechanism controllable from a remote point.

Another object is the provision of an automatically controlled hydraulic transmission having a rapid traverse pump and a continuously flooded feed rate pump.

Another object is the provision of an improved hydraulic transmission for machine tools for effecting movement of the driven part alternatively at feed or rapid traverse rates and without disturbing the pre-set adjustment of the feed rate.

Another object is to utilize the pressure generated by one of the pumps of a multi-pump hydraulic transmission for energizing the control mechanism thereof.

Another object is the provision in a multi-pump hydraulic transmission of hydraulic control means therefor which responds automatically to movement produced by the transmission.

Another object is the provision of a control means for multi-pump hydraulic transmissions which is alternatively operable either automatically or manually.

Another object is the provision in a variable displacement pump of improved regulating means therefor operable to effect delivery of liquid alternatively at any of a plurality of predetermined rates in one direction.

Another object is the provision in a variable displacement pump of a plurality of fluid actuated means selectively operable to regulate pump displacement.

Another object is the provision in a variable displacement pump of improved pipe conduits flexibly connected in such manner as to render the use of flexible hose unnecessary.

Other objects and advantages will appear from the following description of an illustrative embodiment of the present invention.

In the drawings:

Fig. 6 is a diagrammatic view illustrating the application of the pump mechanism to a typical form of lathe.

Fig. 7 is a diagram of the hydraulic circuit.

Fig. 8 is a sectional view of a valve employed, taken in the plane of the line 8—8 of Figure 1.

Figs. 9 and 10 are sectional views of the same valve taken in the plane of the line 9—9 of Figure 1, and showing the same in two rotative positions.

Fig. 11 is a sectional view of a control valve taken substantially on the line 11—11 of Figure 12, showing the valve in neutral position.

Fig. 12 is a sectional view of the same valve taken substantially on the line 12—12 of Figure 11 and showing the same in full lines in one extreme position and in dotted lines in the other extreme position.

Fig. 13 is a view similar to Figure 12 showing the valve in dotted and full lines in two intermediate positions.

Fig. 14 is a front elevation of operating mechanism for the control valve.

Fig. 15 is a vertical sectional view taken substantially along the line 15—15 of Figure 14.

Fig. 16 is a horizontal sectional view taken substantially along the line 16—16 of Figure 14.

Figure 1:
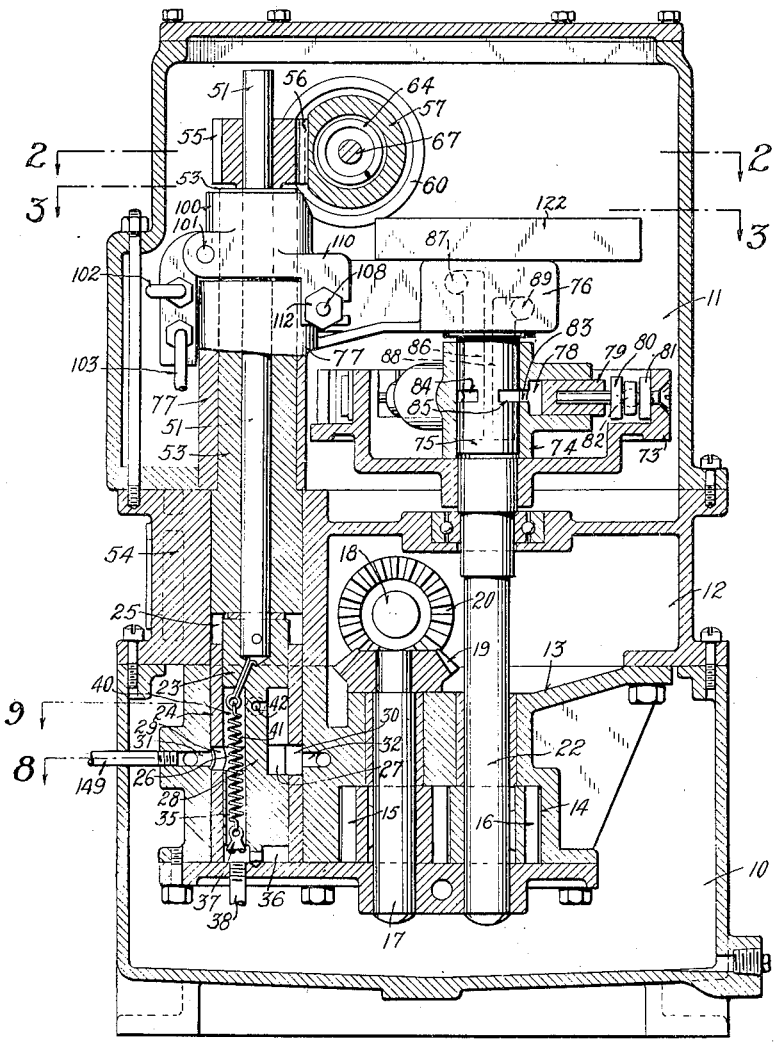
Figure 1 is a vertical sectional view taken substantially along the line 1—1 of Figures 2 and 3 of a pump mechanism constructed in accordance with the present invention.

The pump mechanism shown in Figures 1 to 5 is enclosed within a three part casing comprising a base portion 10, a top portion 11, and an intermediate portion 12. The base portion 10 constitutes an oil reservoir. A casting 13 fixed to and supported by the intermediate portion 12 and depending into the base portion 10, is provided with an appropriate chamber 14, housing a pair of intermeshing gears 15 and 16, which comprise a gear pump of a well-known type, constituting what is hereinafter termed a rapid transverse pump. One of the gears 15 is keyed to and driven by a vertical shaft 17, journaled in the casting 13. Shaft 17 is driven from a drive shaft 18 through appropriate bevel gears 19 and 20. Shaft 18 is journaled horizontally in the intermediate portion 12 and is driven from any appropriate source of power through a pulley 21 or the like fixed thereto. The other gear 16 is keyed to a second vertical shaft 22 extending upwardly through the intermediate portion 12 and constituting a drive shaft for a variable displacement pump hereinafter referred to.

A rotary valve 23 is fitted within a sleeve 24, fixed within an appropriate bore 25 formed in the casing 13. This valve, as shown in Figures 1 and 7 to 10, is of cylindrical form for the most part, but, intermediate its ends, is cut away at opposite sides to form two chambers 26 and 27 separated by an arcuate partition 28. Two oppositely disposed ports 29 and 30 are formed through the wall of the sleeve 24. Port 30 communicates with chamber 27 in all positions of the valve, and port 29 is opened to either of the chambers 26 or 27 by rotation of the valve. Both ports are always in open communication with the discharge side of the gear pump through passages 31 and 32, passage 32 being connected to the pump through passage 33 and passage 31 being connected to the pump through passage 33 and branch passage 34. A passage 35 leads downwardly through the valve from chamber 26 to a chamber 36 in the bottom of the bore 25, the lower end of this passage being closed by a spring loaded check valve 37. The chamber 36 is in open communication with a discharge or drain passage 38 which connects with a pipe 39 leading to the intake side of the gear pump. A channel 40 leading upwardly from chamber 26 houses the coil spring 41 which serves to yieldably hold the valve 37 closed.

Above the plane of chambers 26 and 27 the valve is provided with a diametral passage 42 terminating in laterally disposed extension cavities 43 and 44, which cooperate with oppositely disposed ports 45 and 46 through the wall of the sleeve 24. Ports 45 and 46 are in open communication through pipes 47 and 48, respectively, with the opposite sides of the main hydraulic circuit to be hereinafter described. Communication is maintained between the chamber 27 and passage 42 through a narrow extension chamber 49 leading upwardly from chamber 27, and a passage 50 connecting chamber 49 and passage 42.

The valve and its hydraulic connections are fully described in my copending application hereinabove identified. It will therefore suffice here to say that the valve may be rotated within the sleeve 24 through an angle of one hundred eighty degrees between the two extreme positions illustrated in Figures 9 and 10, respectively. The valve however, normally assumes the intermediate position shown in Figure 7. In this position liquid discharged by the gear pump passes through pipes 33, 34 and 31, and port 29, into chamber 26, and thence downwardly through passage 35, past the valve 37 into chamber 36, from which it is free to flow back to the pump through pipes 38 and 39. The escape from passage 35 is resisted by the valve so that a predetermined pressure, dependent upon the tension in spring 41, is maintained within the chamber 26 and the pipes 31, 34, and 33. The liquid under pressure within the pipe 33 is free to pass through pipe 32, port 30, chambers 27 and 49, passages 50, 42, and 43, port 45 and pipe 47, into one side of the main hydraulic circuit to maintain that side flooded with liquid under pressure. With the valve in the extreme position of Figures 8 and 9, chamber 26 is out of communication with port 29 and chamber 27 is in communication with both ports 29 and 30 so as to receive the entire discharge from the gear pump. Chamber 27 is in communication with port 45 through chamber 49 and chamber 26 is in communication with port 46 through channel 40, so that the entire discharge from the gear pump is delivered through pipe 47 into one side of the main circuit and fluid from the other side of the main circuit may pass through port 48, channel 40, chamber 26, passage 35, and chamber 36 to the discharge port 38.

With the valve in the other extreme position of Figure 10 chamber 26 is in communication with port 45 and chamber 49 communicates with port 46, so that the entire discharge from the gear pump passes through chambers 27 and 49, port 46, and pipe 48 into the other side of the main circuit and may return through port 45, channel 40, chamber 26, and chamber 36 to the discharge pipe 39.

Figure 2:
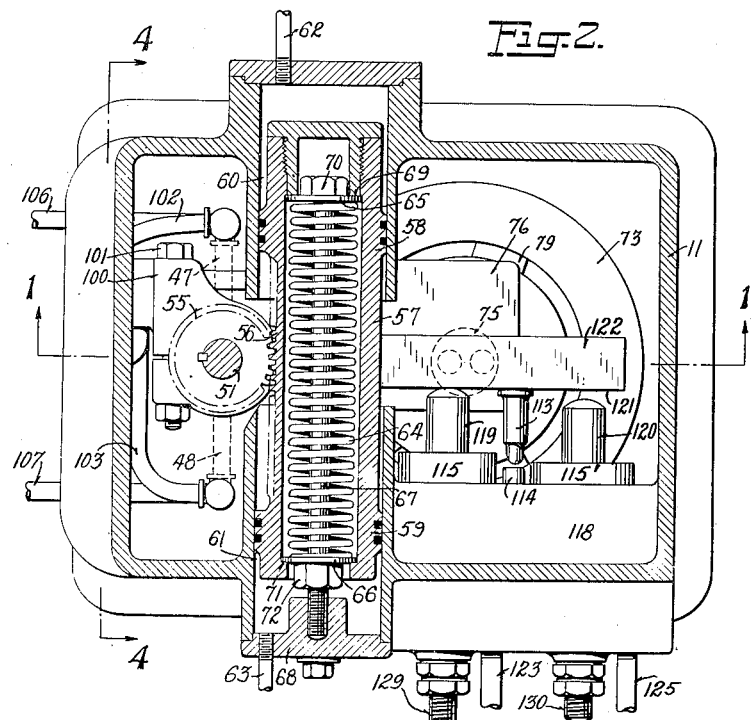
Fig. 2 is a horizontal sectional view taken substantially along the line 2—2 of Figure 1.

The valve 23 is actuated and controlled by a stem 51, connected at its lower end thereto, and extending upwardly through a hollow post 53, firmly anchored in a heavy boss 54 constituting an integral part of the intermediate portion of the housing. A pinion 55 fixed to the stem 51 adjacent the upper end thereof, meshes with a rack 56 formed on the flattened side of a double acting plunger or ram 57 (Fig. 2). The ram shown is of hollow form and is provided at opposite ends with piston heads 58 and 59, closely fitted for reciprocation in cylinders 60 and 61, respectively, formed as integral parts of the upper portion 11 of the housing. Fluid under pressure may be admitted to either of the cylinders 60 or 61 through pipes 62 or 63, in a manner to be hereinafter described, so as to actuate the ram 57, and consequently rotate the pinion 55 and valve, in either direction.

A coil spring 64 within the ram 57 serves to yieldably retain the ram in the intermediate position shown. This spring is confined between two end collars 65 and 66 loosely mounted on a rod 67 firmly anchored at one end in the end head 68 of cylinder 61. The spring normally maintains collar 65 against an internal shoulder 69 of the ram and against the head 70 of the rod. The spring also normally maintains collar 66 against an internal shoulder 71 of the ram and against a nut 72 on the rod. When the ram is moved downwardly (Fig. 2) collar 66 is held against movement by the nut 72 and the internal shoulder 71 moves downwardly away from the collar, the internal shoulder 69 forcing the collar 65 downwardly away from the head 70 against the pressure of the spring. Upon movement of the ram upwardly from the position shown collar 65 is held against movement by the head 70 and the internal shoulder 69 moves upwardly away from the collar, the internal shoulder 71 forcing the collar 66 upwardly away from the nut 72 against the pressure of the spring. The spring is thus compressed by movement of the ram in either direction from the intermediate position shown and serves to automatically return the ram to this intermediate position, upon release of the fluid actuating pressure in either of the cylinders 60 or 61.

Figure 3:
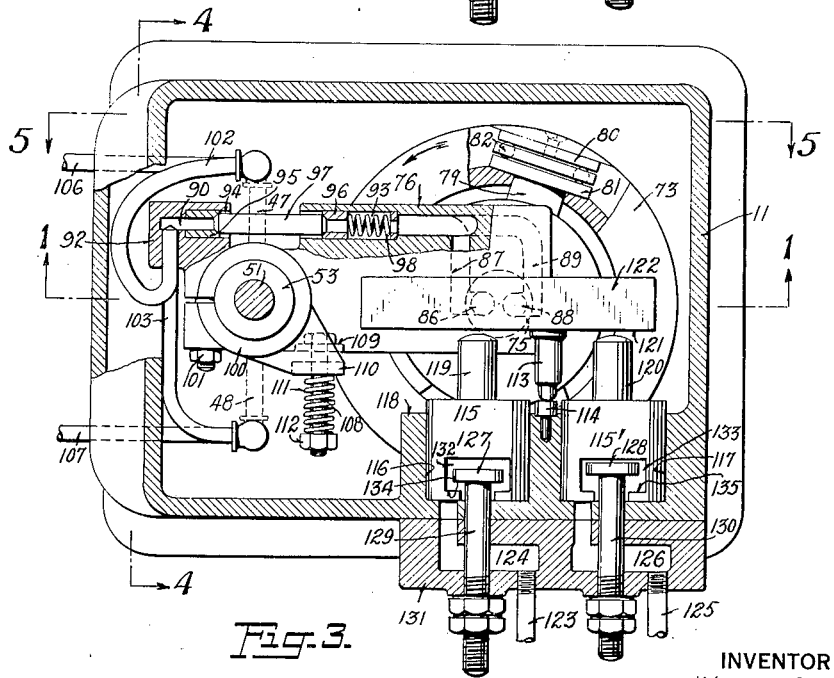
Fig. 3 is a horizontal sectional view taken substantially along the line 3—3 of Figure 1.
Figure 4:
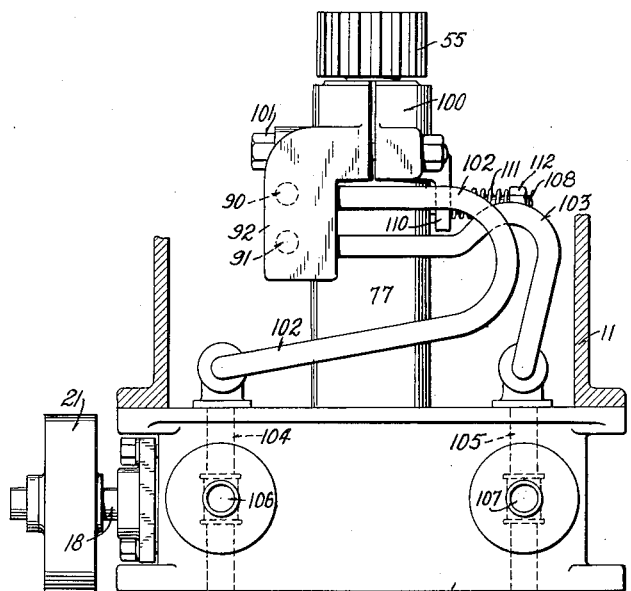
Fig. 4 is a view taken substantially along the line 4—4 of Figures 2 and 3.
Figure 5:
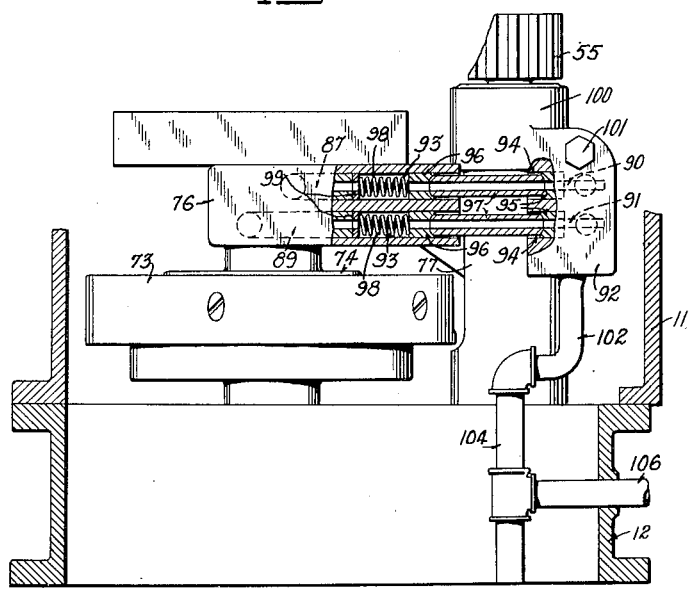
Fig. 5 is a view taken substantially along the line 5—5 of Figure 3.

A variable displacement pump, constituting what is hereinafter termed a feed rate pump, is mounted within the upper portion 11 of the housing. The pump shown in Figures 1, 2 and 3 is of a type fully described in my copending application hereinabove identified. It comprises a substantially circular driver 73 keyed to the upper end of the shaft 22 so as to rotate about a fixed vertical axis. Within the driver 73 is a cylinder barrel 74 mounted for rotation about a cylindrical pintle 75, fixed to and depending from a horizontal arm 76, supported by an integral sleeve 77, rotatably mounted upon the vertical post 53. The cylinder barrel is provided with a series of radial cylinder bores 78, each having a piston 79 closely fitted to reciprocate therein. Each piston is provided with a cross-head 80 extending parallel to one of a series of tangential reaction faces 81 on the driver 73. A roller bearing 82 between each cross-head and reaction face transmits the pressure therebetween. Each cylinder is provided with a port 83 arranged to communicate alternately with gashes 84 and 85, formed in the opposite sides of the pintle 75, during rotation of the cylinder barrel thereon. The arrangement is such that when the arm 76 is so positioned that the axis of the pintle 75 coincides with the axis of the shaft 22, the cylinder barrel and driver rotate without causing reciprocation of the pistons within the cylinders, and pump displacement is zero. However, upon adjusting the arm 76 so as to shift the axis of the pintle to one side of the axis of the shaft 22 each piston reciprocates in its cylinder through a distance proportional to the degree of eccentricity, and the actual rate of liquid displaced by the pump is proportional to the distance between these axes. The pump is operated continuously by the shaft 22 so as to rotate in a counter-clockwise direction (Fig. 3) and when the arm 76 is adjusted so as to shift the pintle 75 upwardly out of coincidence with the shaft 22, each piston while on the right side of the pintle forces liquid through port 83 into the gash 85 and while on the left side of the pintle sucks liquid from the other gash 84 through the port 83 into the cylinder bore.

A passage 86, communicating with gash 84, leads upwardly through the pintle to a passage 87 in the arm 76, and a similar passage 88, communicating with gash 85, communicates with a passage 89 in the arm 76. Passages 87 and 89 are in this instance connected with passages 90 and 91, respectively, in a fixed abutment 92, through flexible connections that will permit the required adjustment of the arm 76. Novel connections for this purpose will now be described, reference being made particularly to Figures 3 and 5.

In this instance each of the passages 87 and 89 has an enlarged bore 93 opening toward the passages 90 and 91, respectively, and passages 90 and 91 are provided with similar enlarged bores 94. See Figures 3 and 5. A hollow bushing 95 is fixed within each bore 94 and a similar sleeve 96 is slidably mounted within each bore 93. Two tubes 97 each having one end loosely disposed within one of the bores 93 and the other end loosely disposed within one of the bores 94 complete the connections between passages 87 and 90 and between passages 89 and 91. The two ends of each tube are rounded off so as to fit snugly against a substantially spherical seat formed upon the cooperating end faces of the sleeves 96 and bushings 95. A spring 98 interposed between each sleeve 96 and a collar 99 fixed in each bore 93 forces the sleeve 96 outwardly so as to maintain the opposite ends of each tube in tight contact with the cooperating seats in the sleeve 96 and bushing 95. As the fluid pressure builds up within the passages 87 or 89 it acts against the inner end of the corresponding sleeve 96 so as to increase the contact pressure of the opposite ends of the tube 97 against the spherical seats. A fluid tight connection is thus maintained between passages 87 and 90 and between passages 89 and 91, capable of transmitting fluid at exceedingly high pressures, and of sufficient flexibility to permit the desired limited swinging action of the arm 76 with respect to the fixed abutment 92. The fact that each sleeve 96 is free to slide within its bore 93, and the fact that each end of each tube 97 is free to adjust itself within its spherical seat insures the desired flexibility. It will also be noted that the fluid pressure within either of the bores 93 reacts in such manner as to maintain a thrust on the arm 76 tending to swing the arm downwardly (Fig. 3).

The abutment 92 is in this instance supported by a clamp ring 100 firmly bound to the upper end of the post 53 by an appropriate clamp bolt 101. Passages 90 and 91 in the abutment 92 communicate, respectively, with pipes 102 and 103, leading from the abutment 92 to vertical pipes 104 and 105, which communicate with pipes 106 and 107 constituting the two sides of the main hydraulic circuit. Pipes 104 and 105 also communicate with pipes 47 and 48, hereinabove mentioned, leading to the ports 45 and 46, respectively, in the sleeve 24 enclosing the valve 23.

As hereinabove pointed out the arm 76 is mounted to swing about the vertical post 53 so as to adjust the pintle 75 laterally to vary pump displacement. This arm is yieldably maintained in the position shown in Figure 3, with the pintle 75 concentrically disposed with respect to the shaft 22. In this instance a tension rod 108, anchored as at 109 to the arm 76, projects loosely through a bracket 110 supported by the clamp ring 100, and a spring 111 interposed between the head 112 of the rod and the face of the bracket 110 tends at all times to swing the arm 76 downwardly (Fig. 3). Downward movement of the arm is limited by engagement of an appropriate stop 113 on the arm with a corresponding stop 114 fixed in the housing. In this position of the arm 76, pump displacement is zero and the pump is ineffective. By swinging this arm upwardly (Fig. 3) the pump is rendered effective and caused to deliver liquid into passage 89 and to receive liquid from passage 87, at a rate corresponding to the distance through which the arm is swung.

In this instance the arm 76 is adjusted from the neutral position shown by action of any of a plurality of fluid actuated pistons each of which is operable to swing the arm through a definite distance. Two pistons 115 and 115' are shown. They are mounted in cylinder bores 116 and 117, formed in a block 118 constituting an integral part of the upper portion 11 of the main housing, and each is provided with an extension 119-120 adapted to engage the side face 121 of a block 122 fixed to the top face of the arm 76.

Cylinder bore 116 may be supplied with fluid under pressure from a pipe 123 through a passage 124, and cylinder bore 117 may be supplied with fluid under pressure from a pipe 125 through a passage 126. The extent of movement of each piston 115-115' is limited by the head 127-128 of a rod 129-130, adjustably fixed in the block 131, and extending into a T-slot 132-133 formed through the piston. The arrangement is such that when fluid pressure is applied to the piston 115 from pipe 123, the piston advances until the internal shoulder 134 of the T-slot 132 engages the head 127, and in this advance the extension 119 engages the block 122 and swings the arm 76 a definite distance upwardly (Fig. 3) from the position shown, thus causing the pump to deliver liquid at a definite rate through the passage 89. Similarly when fluid pressure is applied to the piston 115' from pipe 125, this piston advances until the internal shoulder 135 engages the head 128, and in this advance the extension 120 swings the arm 76 a definite distance upwardly. The rods 129 and 130 are shown so adjusted that the throw of the piston 115' is greater than that of the piston 115 so that when piston 115' is actuated the arm 76 is moved a greater distance than when piston 115 is actuated, so as to cause the pump to deliver liquid at a greater rate through passage 89. Upon the release of pressure in the pipes 123 and 125, the arm 76 is returned to neutral position by the action of spring 111.

Fluid pressure is selectively applied to each of the pipes 62 and 63 (Fig. 2) and pipes 123 and 125 through a control valve of any appropriate type. A valve, well adapted for the purpose, is illustrated in Figures 11, 12 and 13. This valve comprises a casing 136 having a cylindrical bore 137 provided with a series of annular grooves 138, 139, 140, 141 and 142 formed in the wall thereof. A hollow valve element having two piston heads 143 and 144 connected by a reduced portion 145 is closely fitted for reciprocation in the bore 137. The ends of the bore 137 are always in open communication through the hollow valve element and open to exhaust through a drain passage 146. The annular space 147 surrounding the reduced portion 145 of the valve is always in open communication with the groove 139. The piston head 143 cooperates with groove 138 to control communication between it and the annular space 147, and the piston head 144 cooperates with grooves 140, 141 and 142 to control communication between them and the annular space 147. Groove 139 communicates through a port 148 with a pipe 149 leading to a source of fluid under pressure. In this instance pipe 149 is connected with the passage 31 hereinabove mentioned containing liquid under pressure received from the gear pump. (See Figs. 1 and 7.) Groove 138 communicates through a port 150 with the pipe 63 leading to cylinder 61, groove 142 communicates through a port 151 with the pipe 62 leading to cylinder 60, groove 140 communicates through a port 152 with pipe 123 leading to cylinder bore 116, and groove 141 communicates through a port 153 with pipe 125 leading to cylinder bore 117.

The arrangement is such that when the valve is in the intermediate position shown in Figure 11, the several grooves 138, 140, 141 and 142 are all open to the drain passage 146 so that there is no pressure existing in any of the pipes 62, 63, 123 or 125. Under these conditions the plunger 57 is in the intermediate position of Figure 2, so that the valve 23 is in the intermediate position of Figure 7, and the arm 76 is in the neutral position shown in Figure 3, so that the variable displacement pump is in zero displacement condition. When shifted into the dotted line position of Figure 12 the valve opens communication between grooves 138 and 139 through the annular space 147 and the fluid pressure in pipe 149 is transmitted through pipe 63 to the cylinder 61 and the plunger 57 is forced upwardly (Fig. 2) causing the valve 23 to be rotated into the position of Figures 8 and 9. When the valve is shifted into the dotted line position of Figure 13, groove 138 is again opened to the exhaust, so that the pressure in pipe 63 is destroyed, and communication is established between grooves 139 and 140, so that pressure is established in pipe 123 leading to the cylinder 116. The plunger 57 is thus returned to the intermediate position of Figure 2, under the action of spring 64, and the valve 23 consequently returned to the intermediate position of Figure 7. Also the pressure established in pipe 123 and cylinder 116 causes the piston 115 to advance its full stroke to thereby shift the arm 76 upwardly (Fig. 3) and cause the variable displacement pump to deliver liquid at a relatively slow rate through the passage 89. With the valve in the full line position of Figure 13 communication is also established between grooves 139 and 141, so that pressure is established in pipe 125 and cylinder 117 and piston 115′ is advanced its full stroke. Since the stroke of piston 115′ is greater than that of piston 115 the advance of piston 115′ causes a further upward adjustment of the arm 76 to increase the rate of discharge of the pump into the passage 89. With the valve in the full line position of Figure 12 communication is also established between grooves 139 and 142, so that pressure is established in pipe 62 and cylinder 60, and the plunger 57 is forced downwardly (Fig. 2), thereby rotating the valve 23 into the position of Figure 10.

The application of the pump mechanism thus far described to a lathe of conventional form is diagrammatically illustrated in Figure 6. The lathe shown includes the usual bed 154, head stock 155, and tool carriage 156 mounted to travel toward and from the work 157 supported by the rotating chuck 158. The tool carriage shown is provided with a turret head 200 adapted to support various kinds of tools such as the boring tool 201 shown applied thereto. The tool carriage is actuated by a piston 159 reciprocating in a cylinder 160 supported in fixed position upon the lathe bed. The two ends of the cylinder are connected with the pump mechanism through the pipes 106 and 107 constituting the two sides of the main hydraulic circuit. It will be noted that by this direct connection the movement of the piston 159, and consequently the tool carriage, will correspond at all times to the rate and direction of discharge of liquid from the pump mechanism.

The control valve 136 is shown mounted in fixed position against the side of the lathe bed and is controlled by a rod 161, connected through a link 162 to a depending arm 162′, formed as an integral part of a hand lever 163. (See Figures 6, 14, 15 and 16.) Lever 163 is fixed to one end of a horizontal rock shaft 164 journaled in an appropriate bracket 165 fixed to the side of the lathe bed 154, so that the rod 161, and consequently the valve 136, responds at all times to the position of the lever 163. This lever may be actuated and controlled by the operator through the handle 166, or may be placed under the control of automatic mechanism of any approved design. One form of automatic mechanism will now be described.

This mechanism includes a bar 167 mounted to reciprocate vertically in the bracket 165. The bar carries a cam roller 168 controlled by a pair of cam plates 169 and 170 fixed to the tool carriage 156 and traveling therewith. The lower edge 171 of cam plate 169 is substantially horizontal except for an inclined portion 172 adjacent one end thereof. Cam plate 170 extends horizontally and is spaced below plate 169. The lower edge of plate 170 is formed with three vertically offset horizontal portions 173, 174, and 175 connected by shoulders 176 and 177. The bar is forced upwardly at all times under the yielding pressure of a spring 178. A pin 179 carried by the bar 167 projects into a slot 180, formed in a lever 181, loosely mounted upon the rock shaft 164, so that the lever 181 swings vertically in accordance with vertical movement of the bar.

Provision is made for releasably connecting levers 181 and 163, so that lever 163 may be made to respond to all movements of lever 181 and the bar 167. In this instance a notch 182 is provided in the end of lever 181 to snugly receive a dog 183 formed as an integral part of the handle 166.

The handle is connected with the lever 163 through a vertical pivot pin 184 so as to permit the handle to be swung in such direction as to engage the dog 183 in the notch 182. By swinging the handle in the other direction the dog 183 may be withdrawn from the notch 182 and engaged in a notch 185 formed in a fixed quadrant 186, so as to guard against accidental displacement of the lever 163 from neutral position. The handle 166 may thus be made to assume three distinct positions on the lever 163. In the position shown in Figure 16 the handle is in neutral position with the dog 183 free of both notches 182 and 185. In this position of the handle the lever 163 is disconnected from lever 181 and the valve 136 is under the full control of the operator independently of the action of the bar 167 and lever 181. By swinging the handle outwardly, dog 183 may be engaged with notch 185, and the lever 163 is locked in neutral position. By swinging the handle inwardly dog 183 may be engaged with notch 182, so as to connect levers 163 and 181 and to thereby place the valve 136 under the control of the automatic mechanism. Any appropriate means such as a spring pressed pawl 187 carried by the handle and cooperating with the projected end 188 of lever 163 may be employed to yieldably retain the handle in any of the three positions just described.

A brief description of a complete operating cycle, with the lathe under the control of the automatic mechanism, will now be given. When under automatic control the dog 183 on handle 166 is engaged in notch 182 in lever 181 so that levers 181 and 163 must move in unison in response to vertical movement of the slide bar 167. Before beginning an operating cycle the cam roller 168 on bar 167 presses upwardly against the inclined portion 172 of the cam plate 169. In this position of the parts the valve 136 is in the neutral position shown in Figure 11, and there is no flow of liquid in pipes 106 and 107. The piston 159 and tool carriage are at rest in retracted position.

To begin the cycle the operator depresses the handle 166, so as to swing the lever 163 down to thereby shift the valve 136 into the full line position of Figure 12. Pressure is thus established in pipes 62, 123 and 125, so that plunger 57 is forced downwardly (Fig. 2) to thereby rotate valve 23 into the position of Figure 10, and both pistons 115 and 115' are advanced to thereby shift the arm 76 upwardly into the position shown in Figure 7. This causes the variable displacement pump to deliver liquid at a relatively high rate through passage 89 and pipes 105 and 107 to the outer end of the cylinder 160, and the entire discharge from the gear pump is delivered through valve 23 and pipe 48 into the pipe 107 and cylinder 160. The discharge from the gear pump is thus added to the discharge from the variable displacement pump, so that the piston 159 and tool carriage advance toward the work at high speed, appropriate for rapid traverse. The major portion of the liquid discharged from the inner end of the cylinder 160 returns through pipes 106 and 104 and passage 87 back to the variable displacement pump, the excess liquid escaping from the circuit through pipe 47, port 45, channel 40, chamber 26, passage 35, chamber 36 and drain pipe 38.

As the operator swung the lever 163 downwardly, lever 181, moving with it, forced the bar 167 downwardly so that the roller 168 was depressed below the cam plate 170. Then as soon as the tool carriage started its advance, the operator released the lever 163, and the bar 167, under the action of spring 178, pressed the roller 168 against the horizontal portion 173 of the cam plate 170.

The tool carriage then continues to advance at this high rate with the roller 168 riding upon the portion 173 of the cam plate until the shoulder 176 is reached. This occurs at the time when the tool is about to engage the work, and the roller 168 passing over this shoulder onto the higher portion 174 of the cam plate causes the lever 181 and consequently lever 163, to swing upwardly, to thereby shift the valve into the full line position of Figure 13. The pressure in pipe 62 and cylinder 60 is thus destroyed and the plunger 57, returning into intermediate position, rotates the valve 23 into the intermediate position of Figure 7. In this position of valve 23, port 46 is blocked and the discharge from the gear pump no longer enters the pipe 107, and the speed of advance of the piston 159 and tool carriage is reduced to that appropriate for a high speed cutting feed. The actual rate of advance of the tool carriage at this time is accurately determined by the rate of discharge of the variable delivery pump, which is determined by the distance the arm 76 has been moved from neutral position by the piston 115'. At this time the gear pump is in open communication through pipes 33 and 47 with the pipe 106 so as to maintain the return side of the variable delivery pump flooded with liquid under pressure.

The tool carriage continues to advance at this feed rate, until the roller 168 rides over the shoulder 177 onto the portion 175 of the cam plate 170. When this occurs the bar 167 and lever 163 are again lifted and the valve 136 shifted into the dotted line position of Figure 13. When this occurs the pressure in pipe 125 and cylinder 117 is destroyed and piston 115' is retracted permitting the arm 76 to lower until the block 122 thereon strikes the extension 119 on piston 115. (See Fig. 2.) The variable displacement pump is thus adjusted so as to reduce the rate of discharge thereof, and the piston 159 and tool carriage continue to advance at a correspondingly slower feed rate.

This advance continues until the roller 168 clears the end of portion 175 of the cam plate 170, whereupon the bar 167 rises until the roller 168 strikes the lower horizontal edge 171 of the cam plate 169. This movement of the bar 167 lifts the levers 181 and 163 so as to shift the valve 136 into the dotted line position of Figure 12. The pressure in pipe 123 and cylinder 116 is thus released and the arm 76 returns to the neutral position of Figure 3, and the variable displacement pump is thereby adjusted to reduce the discharge therefrom to zero. Pressure is established however in pipe 63 and cylinder 61, so that plunger 57 is shifted and valve 23 rotated into the position of Figures 8 and 9. The entire discharge from the gear pump is thus directed through pipes 47 and 106 into the inner end of the cylinder 160, and the piston 159 and tool carriage begin their return stroke. Ordinarily the capacity of the gear pump is considerably greater than that of the variable displacement pump so that the tool carriage ordinarily returns at a rate considerably greater than the maximum rate of feed during the cut. This rapid traverse return of the carriage continues until the roller 168 rides against the inclined portion 172 of cam plate 169 and is depressed thereby into the position shown in Figure 6. The valve 136 is thus returned to the position shown in Figure 11, thereby destroying the pressure in pipe 63 and permitting the valve 23 to return to the intermediate position of Figure 7. The variable displacement pump having been previously reduced to zero stroke position, and the port 46 being blocked by the return of valve 23 to intermediate position, there is no flow in pipes 106 and 107 and the tool carriage comes to rest.

Various changes may be made in the embodiment of the invention hereinabove described without departing from or sacrificing any of the advantages of the invention as defined in the appended claims.

I claim:

1. In a hydraulic transmission the combination with a hydraulic motor of a plurality of pumps for driving said motor, means for controlling the discharge from said pumps to regulate the speed of said motor, and means actuated by fluid pressure generated by one of said pumps for operating said control means.

2. In a hydraulic transmission the combination with a hydraulic motor of two pumps of different capacities for operating said motor, means for controlling the discharge from said pumps to regulate the speed of said motor, and means actuated by fluid pressure generated by one of said pumps for operating said control means.

3. In a hydraulic transmission the combination with a hydraulic motor of a variable displacement pump for driving said motor, a second pump for driving said motor, means for controlling the discharge from said pumps to regulate the speed of said motor, and means actuated by fluid pressure generated by said second pump for operating said control means.

4. In a hydraulic transmission the combination with a hydraulic motor of a variable displacement pump for driving said motor, a constant displacement pump for driving said motor, and means actuated by fluid pressure generated by said constant displacement pump for controlling the discharge from said pumps to thereby regulate the speed of said motor.

5. In a hydraulic transmission the combination of a hydraulic circuit including a pump and motor, a second pump, means for directing the discharge from said second pump into either side of said circuit, selectively, and means actuated by the fluid pressure generated by said second pump for operating said directing means.

6. In a hydraulic transmission the combination of a motor, a variable displacement pump, a hydraulic circuit connecting said pump and motor, a second pump, means for connecting said second pump in driving relation with said motor, and means actuated by the fluid pressure generated by said second pump for regulating the displacement of said first named pump.

7. In a hydraulic transmission the combination of a motor, a variable displacement pump for driving said motor, a constant displacement pump for driving said motor, means for regulating the displacement of said variable displacement pump, and means actuated by the fluid pressure generated by said constant displacement pump for actuating said regulating means.

8. In a hydraulic transmission the combination of a motor, a variable displacement pump for driving said motor, means for regulating pump displacement, a constant displacement pump, means operable to connect said constant displacement pump in driving relation with said motor, and means actuated by the fluid pressure generated by said constant displacement pump for operating said regulating means and said connecting means.

9. In a hydraulic transmission the combination of a motor, a constant displacement pump, means operable to connect the delivery side of said pump with either side of said motor, a variable displacement pump, connections between said variable displacement pump and said motor, means for regulating the displacement of said last named pump, fluid actuated means for operating said first named means, fluid actuated means for operating said regulating means, and means for connecting said constant displacement pump in driving relation with either of said fluid actuated means.

10. In a hydraulic transmission the combination of a motor, a constant displacement pump, means operable to connect the delivery side of said pump with either side of said motor, fluid actuated means for operating said means, a variable displacement pump, connections between said variable displacement pump and said motor, means for regulating the displacement of said last named pump, fluid actuated means for operating said regulating means, and a unitary valve mechanism for controlling both of said fluid actuated means.

11. In a hydraulic transmission the combination of a hydraulic motor, a constant displacement pump, means including valve mechanism for connecting said pump in driving relation with said motor and operable to change the direction of motor actuation, fluid actuated means for operating said valve mechanism, a variable displacement pump, connections between said variable displacement pump and said motor, fluid actuated means for rendering said variable displacement pump effective or ineffective on said motor, and means adjustable to determine the displacement of said variable displacement pump when the same is effective.

12. In a hydraulic transmission the combination of a hydraulic motor, a constant displacement rapid traverse pump, means including valve mechanism for connecting said pump in driving relation with said motor and operable to change the direction of motor actuation, a variable displacement feed rate pump, a hydraulic circuit through which liquid is supplied to said motor from said feed rate pump and through which liquid is supplied to said feed rate pump from said motor, and means adjustable independently of said valve mechanism for determining the feed rate of said pump.

13. In a hydraulic transmission the combination of a motor, a constant displacement pump, a hydraulic circuit including valve mechanism operable to connect the delivery side of said pump with either side of said motor, a variable displacement pump for operating said motor, said last named pump being continuously flooded by liquid received from said circuit, means for regulating the displacement of said variable displacement pump, and means operable independently of said last named means for operating said valve mechanism.

14. In a hydraulic transmission the combination of a hydraulic motor, a rapid traverse pump, a hydraulic circuit including valve mechanism operable to connect said pump with said motor and to effect rapid traverse operation of said motor in either direction, a variable displacement feed rate pump for effecting operation of said motor at a predetermined feed rate, channel connections through which said feed rate pump is supplied with liquid from said circuit to maintain said feed rate pump flooded under all conditions of motor operation, means for regulating the displacement of said feed pump to determine the feed rate, and means operable independently of said last named means for operating said valve mechanism.

15. In a hydraulic transmission the combination of a motor, a plurality of pumps for driving said motor at different speeds, a plurality of mechanisms each operated by fluid pressure generated by one of said pumps for regulating rate and direction of motor operation, and means for controlling the application of fluid pressure to said mechanisms.

16. In a hydraulic transmission the combination of a motor, a variable displacement pump for operating said motor, a constant displacement pump, a plurality of separate mechanisms each operated by fluid pressure generated by said constant displacement pump for effecting predetermined variations in pump displacement, and means for controlling the application of fluid pressure to said mechanisms.

17. In a hydraulic transmission the combination of a motor, a variable displacement pump, hydraulic connections between said pump and motor, a constant displacement pump, a plurality of separate mechanisms each operated by fluid pressure generated by said last named pump for effecting predetermined variations in the rate of flow of driving liquid through said connections, and means for controlling the application of fluid pressure to said mechanisms to control the speed of said motor.

18. In a hydraulic transmission the combination of a motor, means for delivering a driving liquid to said motor, a plurality of fluid actuated devices separately operable to effect predetermined variations in the rate of flow of liquid to said motor, and means for controlling the application of fluid pressure to said devices to regulate said motor.

19. In a hydraulic transmission the combination of a motor, means for delivering a driving liquid to said motor, a plurality of separately operable fluid actuated devices for effecting a step-by-step regulation of the flow of liquid to said motor, a fluid pressure source, and a valve between said source and said devices for controlling the application of fluid pressure thereto to thereby regulate said motor.

20. In a hydraulic transmission the combination of a motor, means for delivering a driving liquid to said motor, a plurality of separate fluid actuated devices for regulating the flow of driving liquid to said motor, and means controlled by said motor for controlling the application of fluid pressure to said devices to thereby vary the speed of said motor.

21. In a hydraulic transmission the combination of a motor, a variable displacement pump for driving said motor, a fluid actuated device for regulating pump displacement, a second pump, a fluid actuated device controlling communication between said last named pump and said motor, and means controlled by said motor for controlling the application of fluid pressure to said devices to thereby regulate said motor.

22. In a hydraulic transmission the combination of a motor, a variable displacement pump for driving said motor at relatively low speeds, a second pump for driving said motor at relatively high speeds, means actuated by fluid pressure generated by said second pump for regulating the displacement of said first named pump, means actuated by fluid pressure generated by said second pump for controlling communication between said second pump and motor, and means controlled by said motor for controlling the application of fluid pressure to said fluid actuated means to thereby regulate the speed of said motor.

23. In a hydraulic transmission the combination of a variable displacement pump, a motor driven thereby, a plurality of fluid actuated devices separately operable to determine pump displacement, and means controlled by said motor for controlling the application of fluid pressure to said devices to thereby regulate said motor.

24. In a hydraulic transmission the combination of a variable displacement pump, a motor driven thereby, an element movable to vary the displacement of said pump, means for yieldably retaining said element in one position, a fluid actuated member operable to shift said element into another position, a valve for controlling said member, and adjustable means for limiting the movement of said member to accurately determine the displacement of said pump.

25. In a hydraulic transmission the combination of a variable displacement pump, a circuit fed thereby, an element movable to vary pump displacement, means for yieldably retaining said element in one position, a plurality of fluid actuated members separately operable to shift said element from said position, and separate means for limiting the movement of each of said members.

26. In a hydraulic transmission the combination of a variable displacement pump, a circuit fed thereby, an element movable to vary pump displacement, a plurality of fluid actuated members separately operable upon said element to move the same into different positions, means for limiting the movement of each of said members, and means for controlling the application of fluid pressure to said members to thereby regulate the displacement of said pump.

27. In a hydraulic transmission the combination of a variable displacement pump, a member rockable to vary pump displacement, fluid passages in said member communicating with said pump, a hydraulic circuit, a fixed member having passages communicating with said circuit, and tubes rockably connected with said movable and fixed members for connecting said first named passages, respectively, with said last named passages.

28. In a hydraulic transmission the combination of a variable displacement pump, a member rockable to vary pump displacement, a fluid passage in said member communicating with said pump, a hydraulic circuit, a fixed member having a passage communicating with said circuit, and a tube connecting said passages, said tube being rockably seated at each end within said members so as to accommodate the rocking action of said rockable member.

29. In a hydraulic transmission the combination of a variable displacement pump, a member rockable to vary pump displacement, a fluid passage in said member communicating with said pump, a hydraulic circuit, a fixed member having a passage communicating with said circuit, a tube connecting said passages, a fixed seat in one of said members rockably engaged with one end of said tube, a movable seat in the other of said members rockably engaged with the other end of said tube, and means for maintaining firm contact between said tube and seats.

30. In a hydraulic transmission the combination of a variable displacement pump, a member rockable to vary pump displacement and having a fluid passage communicating with said pump, a hydraulic circuit, a fixed member having a passage communicating with said circuit, and a flexible connection between said passages reacting under the fluid pressure therein to rock said first named member in one direction.

31. The combination of a hydraulic motor, a member driven by said motor, two pumps for delivering a driving liquid to said motor at different rates, fluid actuated means for controlling the discharge from said pumps, a cam movable with said member, and means controlled by said cam for controlling the application of fluid pressure to said fluid actuated means.

32. The combination of a hydraulic motor, a member driven by said motor, two pumps for delivering a driving liquid to said motor at different rates, means actuated by fluid pressure generated by one of said pumps for controlling the discharge from said pumps, a cam movable with said member, and means controlled by said cam for controlling the application of fluid pressure to said fluid actuated means.

33. The combination of a hydraulic motor, a member driven thereby, means for delivering a driving liquid to said motor, means for regulating the flow of driving liquid to said motor to regulate the speed thereof, means including a handle under the control of the operator for adjusting said regulating means, control mechanism operated by said member, separable connections through which said last named means may be made to respond to the action of said control mechanism, and means responsive to movement of said handle for making and breaking said connections.

34. The combination of a hydraulic motor, a member driven thereby, means for delivering a driving liquid to said motor, means for regulating the flow of driving liquid to said motor, a cam movable with said member, control mechanism actuated by said cam, a hand lever movable in one plane to control the operation of said regulating means, and means controlled by movement of said lever in another plane for placing said lever under the control of said control mechanism.

35. In a hydraulic transmission the combination of a variable displacement pump, a circuit fed thereby, an element movable to vary pump displacement, and a plurality of separate fluid actuated devices coacting with said element to effect a step by step variation in pump displacement.

36. In a hydraulic transmission the combination of a variable displacement pump, a circuit fed thereby, an element movable to vary pump displacement, and a plurality of fluid actuated plungers independently operable upon said element to move the same through predetermined distances.

37. In a hydraulic transmission the combination of a variable displacement pump, a circuit fed thereby, an element movable to vary pump displacement, a plurality of fluid actuated plungers each operable to move said element through a predetermined distance, and means for adjusting the stroke of each of said plungers to thereby vary the effect thereof upon said element.

38. In a hydraulic transmission the combination of a variable stroke pump, a circuit fed thereby, an element movable to vary pump displacement, a fluid actuated plunger having no definite means of attachment to said element but operable thereon to vary pump displacement, and a valve for controlling said plunger.

39. In a hydraulic transmission the combination of a variable stroke pump, a circuit fed thereby, an element movable to vary pump displacement, means normally operating to yieldably retain said element in one position, separate means including a fluid actuated plunger separately operable to move said element against the resistance of said yieldable means, and a valve for controlling said plunger.

40. In a hydraulic transmission the combination of a driven member, a hydraulic motor for driving said member, a hydraulic circuit for driving said motor, said circuit including a variable displacement pump normally operable to meter the rate of liquid flow in said circuit, means coacting with said pump to maintain said circuit flooded with liquid under pressure, and means controlled by said driven member for varying the rate of flow in said circuit.

41. In a hydraulic transmission the combination of a driven member, a hydraulic motor for driving said member, a hydraulic circuit for driving said motor, a metering device for normally regulating the rate of flow in said circuit, means coacting with said device for maintaining said circuit flooded with liquid under pressure, and means controlled by said member for automatically varying the speed of said motor.

42. In a hydraulic transmission the combination of a driven member, a hydraulic motor for driving said member, means including a hydraulic circuit for driving said motor, means for maintaining said circuit flooded with liquid under pressure, and means controlled by said driven member and coacting with said circuit to regulate the speed of said motor.

43. In a machine tool or the like the combination of a reciprocating carrier, hydraulically actuated means for driving said carrier, a hydraulic circuit associated with said means, means for delivering a driving liquid through said circuit to operate said means, means for maintaining said circuit flooded with liquid under pressure, and means controlled by said carrier for varying the rate of flow in said circuit at predetermined points in the path of travel of said carrier.

44. In a machine tool or the like the combination of a reciprocating carrier, hydraulically actuated means for driving said carrier, a hydraulic circuit, a plurality of pumps operable to deliver a driving liquid through said circuit to said means at variable rates, means coacting with said circuit to maintain the same flooded with liquid under pressure, and means controlled by said carrier for varying the rate of flow in said circuit at predetermined points in the path of travel of said carrier.

45. In a machine tool or the like the combination of a reciprocating carrier, hydraulically actuated means for driving said carrier, a plurality of pumps for delivering a driving liquid to said means at variable rates, fluid actuated means for controlling the direction of motion of said carrier, fluid actuated means for varying the rate of motion of said carrier, and valve mechanism controlled by said carrier for controlling both of said fluid actuated means.

46. In a machine tool or the like the combination of a reciprocating carrier, hydraulically actuated means for driving said carrier, means for delivering a driving liquid to said means at variable rates, fluid actuated means for controlling the direction of motion of said carrier, fluid actuated means for varying the rate of motion of said carrier, and valve mechanism controlled by said carrier for controlling both of said fluid actuated means.

47. In a machine tool or the like the combination of a reciprocating carrier, hydraulically actuated means for driving said carrier, means for delivering a driving liquid to said means at variable rates, a control element for controlling said last named means, a cam movable with said carrier and coacting with said element to determine the position thereof in all positions of said carrier, and means controlled by said element for varying the speed of said carrier at a predetermined point during a stroke and to reverse said carrier at the end of a stroke.

48. In a machine tool or the like the combination of a reciprocating carrier, hydraulically actuated means for driving said carrier, fluid actuated means for controlling the direction of motion of said carrier, fluid actuated means for controlling the rate of motion of said carrier, unitary valve mechanism for controlling both of said fluid actuated means, and means controlled by said carrier for controlling said valve mechanism.

49. A machine tool combining a translatable tool head; a hydraulic transmission to effect translation of said tool head, said transmission comprising a cylinder, a piston movable in the cylinder and operatively connected with said tool head; a variable displacement pump; pipes connecting said pump with said cylinder at opposite sides of said piston; hydraulic means, including a fluid pressure line, exteriorly of said pump, connected to said pump, and a controlling valve independent of and remote from said pump and effective in said pressure line to determine the action of said pump and thereby the rate and path of flow of fluid from said pump into said cylinder, to translate said tool head in either direction and at a plurality of rates in one direction; and mechanical means, automatically controlled in the different positions of said head to actuate said valve to effect a predetermined cycle of movement of said tool head.

50. A machine tool combining a translatable tool head; a hydraulic transmission to effect translation of said tool head, said transmission comprising a cylinder, a piston movable in the cylinder and operatively connected with said tool head; a variable displacement pump; pipes connecting said pump with said cylinder at opposite sides of said piston; hydraulic means, including a fluid pressure line, exteriorly of said pump, connected to said pump, and a controlling valve independent of and remote from said pump and effective in said pressure line to determine the action of said pump and thereby the rate and path of flow of fluid from said pump into said cylinder, to translate said tool head in either direction and at a plurality of rates in one direction; and automatic means to actuate said valve a plurality of times during a uni-directional movement of said tool head to vary the output of said pump and thereby the speed of translation of said head during said movement.

51. A machine tool combining a translatable tool head; a hydraulic transmission to effect translation of said tool head, said transmission comprising a cylinder, a piston movable in the cylinder and operatively connected with said tool head; a variable displacement pump; pipes connecting said pump with said cylinder at opposite sides of said piston; hydraulic means, including a fluid pressure line, exteriorly of said pump, connected to said pump, and a controlling valve independent of said pump and effective in said pressure line to determine the action of said pump and thereby the rate and path of flow of fluid from said pump into said cylinder to translate said tool head in either direction and at a plurality of rates in one direction; and means actuated by said tool head and during a uni-directional movement thereof to shift said valve to a plurality of pump-varying positions thereby to change the speed of translation of said head.

52. A machine tool combining a translatable tool head; a hydraulic transmission to effect translation of said tool head, said transmission comprising a cylinder, a piston movable in the cylinder and operatively connected with said tool head; a variable displacement pump; pipes connecting said pump with said cylinder at opposite sides of said piston; hydraulic means, including a fluid pressure line, exteriorly of said pump, connected to said pump, and a controlling valve independent of and remote from said pump and effective in said pressure line to determine the action of said pump and thereby the rate and path of flow of fluid from said pump into said cylinder, to translate said tool head in either direction and at a plurality of rates in one direction; and means, actuated by the movement of said tool head, to move said valve to various positions to cause said pump to effect traversing and feeding movements of said drill head at predetermined times.

53. A control for hydraulic transmissions combining a non-translatable member, a member translatable on said non-translatable member; a variable displacement pump and suitable connections between said pump and said translatable member to effect traversing and feeding movements of the latter; a pump regulator comprising a fluid pressure line connected to said pump and adapted to regulate the rate and path of flow of fluid from said pump into said cylinder, thereby to translate said member in either direction and at a plurality of rates in one direction; a controlling valve embodied in said fluid pressure line, said valve being secured to said non-translatable member and having a portion movable to various positions each of which effects thru said pressure line, a different pump action; valve actuating means, and means supported by said translatable member for actuating said valve actuating means during relative movement of said members.

54. A machine tool combining a standard; a member translatably mounted on said standard; hydraulic means for effecting feeding and rapid traversing movements of said member on said standard, said means including a cylinder secured to said standard, a piston movable in said cylinder and operatively connected with said member, a variable displacement pump, and a pipe connecting said pump with said cylinder; a pump regulator, adapted to control the rate and direction of flow from said pump, comprising a fluid pressure line connected with said pump and a valve located remote from said pump and embodied in said pressure line and controlling the flow of fluid through said line; mechanical means actuated in timed relation with the movement of said member to actuate said valve to cause said pump to effect feeding and traversing movements of said member in a predetermined sequence; and means automatically rendered effective at a predetermined point in translation of said member to render said pump ineffective, thereby to bring said member to rest.

55. A machine tool combining a standard; a member translatably mounted on said standard; hydraulic means for effecting feeding and rapid traversing movements of said member on said standard, said means including a cylinder secured to said standard, a piston movable in said cylinder and operatively connected with said member, a variable displacement pump, and a pipe connecting said pump with said cylinder; a pump regulator, adapted to control the rate and direction of flow from said pump, comprising a fluid pressure line connected with said pump and a valve located remote from said pump and embodied in said pressure line and controlling the flow of fluid through said line; mechanical means actuated in timed relation with the movement of said member to actuate said valve to cause said pump to effect feeding and traversing movements of said member in a predetermined sequence; and manual means operative during the translation of said member to reverse the direction of movement of said member.

56. A machine tool combining a standard; a member translatably mounted on said standard; hydraulic means for effecting feeding and rapid traversing movements of said member on said standard, said means including a cylinder secured to said standard, a piston movable in said cylinder and operatively connected with said member, a variable displacement pump, and a pipe connecting said pump with said cylinder; a pump regulator, adapted to control the rate and direction of flow from said pump, comprising a fluid pressure line connected with said pump and a valve located remote from said pump and embodied in said pressure line and controlling the flow of fluid through said line; means actuated in timed relation with the movement of said member to actuate said valve to cause said pump to effect feeding and traversing movements of said member in a predetermined sequence; manual means operative during the translation of said member to reverse the direction of movement thereof; and means rendered effective by said reverse movement to arrest the translation of said member.

57. A machine tool combining a standard; a member translatably mounted on said standard; hydraulic means for effecting feeding and rapid traversing movements of said member on said standard, said means including a cylinder secured to said standard, a piston movable in said cylinder and operatively connected with said member, a variable displacement pump, and a pipe connecting said pump with said cylinder; a pump regulator, adapted to control the rate and direction of flow from said pump, comprising a fluid pressure line connected with said pump and a valve located remote from said pump and embodied in said pressure line and controlling the flow of fluid through said line; mechanical means actuated in timed relation with the movement of said member to actuate said valve to cause said pump to effect feeding and traversing movements of said member in a predetermined sequence; means automatically rendered effective at a predetermined point in translation of said member to render said pump ineffective, thereby to bring said member to rest; and manual means operative at will to discontinue the movement of said member in one direction and to effect movement thereof in a reverse direction at its rapid rate.

58. A machine tool combining a stationary member; a member translatable on said stationary member; hydraulic transmission for moving said translatable member, said hydraulic transmission including a variable displacement pump; a pump regulator, adapted to control the rate and direction of flow from said pump, comprising a fluid pressure line connected with said pump and a valve located remote from said pump and embodied in said pressure line and controlling the flow of fluid through said line to vary the action of said pump; valve actuating means normally tending to move said valve to effect a predetermined condition in said pump; a stop on said translatable member for opposing said valve actuating means to prevent shifting of said valve under the influence of said actuating means; and means controlled by said translatable member to render said stop ineffective, to permit said valve to move.

59. In a hydraulic transmission including a variable displacement pump, a pump regulator, adapted to control the rate and direction of flow from said pump, comprising a fluid pressure line connected with said pump and a valve located remote from said pump and embodied in said pressure line and controlling the flow of liquid through said line and to said pump; valve actuating means normally tending to move said valve to a predetermined position to effect a predetermined action of said pump; a stop for opposing said valve actuating means to prevent movement of said valve under the influence of said actuating means; and means to render said stop ineffective, to permit the valve to move to said position.

60. A machine tool combining a stationary member; a member translatable on the stationary member; a hydraulic transmission for moving said translatable member, said transmission including a variable displacement pump; a pump regulator, adapted to control the rate and direction of flow from said pump, comprising a fluid pressure line connected with said pump and a valve located remote from said pump and embodied in said pressure line and controlling the flow of fluid through said line; a valve actuator, and means adapted by the relative movement of said members to effect shifting of said valve actuator, and thereby said valve, in a predetermined sequence to vary the action of the pump and the rate of translation of said member.

61. A machine tool combining a movable member; a hydraulic transmission to move said member in a plurality of directions and at a plurality of speeds in one direction, said means including a variable pump; a pump regulator, adapted to control the rate and direction of flow from said pump, comprising a fluid pressure line connected with said pump and a valve located remote from said pump and embodied in said pressure line and controlling the flow of fluid through said line; automatic means controlled by said movable member successively to move said valve to predetermined positions to effect a predetermined cycle of movement of said member; manual means to render said automatic means inoperative; and manual means to shift said valve to any of its operative positions to effect movement of said member in either of two directions at any available rate.

62. A machine combining a support; a head translatably mounted on said support; a hydraulic motor operatively connected with said head for effecting reciprocation of the latter; a pump supplying fluid pressure to actuate said motor; a pump regulator comprising a fluid pressure line receiving fluid from said pump, a valve located exteriorly of said pump and connected with said pressure line, and a plurality of conduits extending back to said pump, said valve having a portion movable to various positions each of which effects, through said pressure line and conduits, different pump action; valve actuating means comprising a hand lever, a slide-bar, a connection between said lever and said slide-bar, an oscillatory shaft actuated from said slide-bar; an operative connection between said shaft and the movable portion of said valve;

and automatic means controlled by said head to shift said slide-bar.

63. A machine tool combining a stationary member; a member translatable thereon; a hydraulic motor for translating the last named member; a pump providing fluid pressure for actuating said motor; pump regulating means comprising a fluid pressure line and a control valve embodied therein; manual means, including an actuating lever to shift said valve to initiate an operative cycle; automatic means controlled by said translatable member operative thereafter to shift said valve to complete said cycle; and a disconnectible connection between said lever and said valve.

64. In a machine tool the combination of a member mounted for feed and rapid traverse movements, a hydraulic motor for driving said member, a hydraulic circuit for driving said motor, a feed rate pump for metering the flow in said circuit to thereby accurately regulate the rate of movement of said member during feeding, a liquid reservoir, a second pump supplied from said reservoir and cooperating with said circuit to keep said feed rate pump flooded, and valve means controlled by said member for directing the discharge of said second pump into the working side of said circuit to increase the rate of flow therein and thereby effect rapid traverse movements of said member.

65. In a machine tool the combination of a member mounted for feed and rapid traverse movements, a hydraulic motor for driving said member, a hydraulic circuit for driving said motor, a variable displacement feed rate pump for metering the flow in said circuit to thereby accurately regulate the rate of movement of said member during feeding, a liquid reservoir, a second pump supplied from said reservoir and cooperating with said circuit to keep said feed rate pump flooded, means for regulating the displacement of said feed rate pump, and separately operable means for connecting said second pump to the working side of said circuit to increase the rate of flow therein and thereby effect rapid traverse movement of said member.

66. In a machine tool the combination of a member mounted for feed and rapid traverse movements, a hydraulic motor for driving said member, hydraulic pump means including a feed rate pump and a rapid traverse rate pump, liquid conducting channels having connections between said pump means and said motor including a plurality of connections changeable to alternatively connect said pumps for feed or rapid traverse rates, one of said channel connections providing a passage through which said feed rate pump is supplied by liquid discharged from said motor during feeding, and valve means automatically operable in response to movement of said member to effect the above named changes in said channel connections.

67. In a machine tool the combination of a member mounted for feed and rapid traverse movements, a hydraulic motor for driving said member, hydraulic pump means including a variable displacement feed rate pump and a rapid traverse rate pump, liquid conducting channels having connections between said pump means and motor including a plurality of connections changeable to alternatively connect said pumps for feed or rapid traverse rates, one of said channel connections providing a passage through which said feed rate pump is supplied by liquid discharged from said motor during feeding, and control means including means for adjusting the displacement of said feed rate pump and valve means independently operable to effect the above named changes in said channel connections.

68. In a machine tool the combination of a member mounted for feed and rapid traverse movements, a hydraulic motor for driving said member, a plurality of unidirectional pumps, liquid conducting channels between said pumps and motor through which said motor is energized and controlled, said channels having a plurality of connections changeable to alternatively connect said pumps for feed or rapid traverse rates and to reverse the direction of movement of said member, one of said channel connections providing a closed passage between said motor and one of said pumps during feeding through which the rate of feed movement of said member is determined by the displacement of said last named pump, said channel connections serving to maintain said last named pump flooded under all conditions of operation, and valve means operable in response to movement of said member to effect the above named changes in said channel connections.

69. In a hydraulic transmission the combination of a main circuit comprising a hydraulic motor, a unidirectional variable displacement pump, and fluid channels for directing the discharge from said pump to said motor and for directing the discharge from said motor to said pump, an auxiliary circuit comprising a second pump, a reservoir, and fluid channels through which said second pump is supplied from said reservoir and through which liquid from said second pump is returnable to said reservoir, and valve mechanism connected with said circuits and operable to direct the discharge from said second pump into one side of said main circuit to increase the flow therein and to simultaneously connect the other side of said main circuit with said reservoir, said valve mechanism being alternatively operable to direct the discharge from said second pump to the last named side of said main circuit to reverse the direction of flow therein and to simultaneously connect the first named side of said main circuit with said reservoir, and means operable independently of said valve mechanism for rendering said variable displacement pump ineffective on said motor.

In witness whereof, I hereunto subscribe my name this 5th day of February, 1926.

WALTER FERRIS.